(12) United States Patent
Andersen

(10) Patent No.: US 8,065,895 B2
(45) Date of Patent: Nov. 29, 2011

(54) PUBLIC FACILITY BICYCLE LOCK

(75) Inventor: Jacob Silas Lee Andersen, Liberty Lake, WA (US)

(73) Assignee: Andersen Holdings, LLC, Liberty Lake, WA (US)

( * ) Notice: Subject to any disclaimer, the term of this patent is extended or adjusted under 35 U.S.C. 154(b) by 0 days.

(21) Appl. No.: 12/713,975

(22) Filed: Feb. 26, 2010

(65) Prior Publication Data

US 2011/0209508 A1 Sep. 1, 2011

(51) Int. Cl.
*E05B 71/00* (2006.01)
(52) U.S. Cl. ........... 70/14; 70/18; 70/30; 70/49; 70/233; 70/278.7; 340/427
(58) Field of Classification Search ............... 70/14, 18, 70/30, 49, 233, DIG. 41, 278.7, 279.1; 242/379, 242/380; 340/5.54, 427, 432
See application file for complete search history.

(56) References Cited

U.S. PATENT DOCUMENTS

| | | | |
|---|---|---|---|
| 3,950,972 A * | 4/1976 | Bleier et al. | 70/234 |
| 4,033,160 A * | 7/1977 | Mima | 70/233 |
| 4,057,986 A * | 11/1977 | Zolke et al. | 70/233 |
| 4,086,795 A * | 5/1978 | Foster et al. | 70/233 |
| 4,379,334 A * | 4/1983 | Feagins et al. | 705/418 |
| 4,773,020 A * | 9/1988 | Anderson et al. | 705/418 |
| 4,807,453 A * | 2/1989 | Bernier et al. | 70/233 |
| 4,885,920 A * | 12/1989 | Larson | 70/49 |
| 4,920,334 A * | 4/1990 | DeVolpi | 340/568.4 |
| 5,245,652 A * | 9/1993 | Larson et al. | 379/102.06 |
| 5,251,464 A * | 10/1993 | Halter | 70/30 |
| 5,361,612 A * | 11/1994 | Voiculescu et al. | 70/241 |
| 5,417,092 A * | 5/1995 | Iu | 70/38 A |
| 5,490,402 A * | 2/1996 | Shieh | 70/39 |
| 5,563,579 A * | 10/1996 | Carter | 340/539.17 |
| 5,768,920 A * | 6/1998 | DeBevoise | 70/18 |
| 5,987,941 A * | 11/1999 | Zocco | 70/63 |
| 6,089,054 A * | 7/2000 | Stukas et al. | 70/18 |
| 6,243,005 B1 * | 6/2001 | Haimovich et al. | 340/427 |
| 6,330,817 B1 * | 12/2001 | Frolov | 70/280 |
| 6,731,212 B2 * | 5/2004 | Hirose et al. | 340/572.9 |
| 7,233,245 B2 * | 6/2007 | O'Neill | 340/568.2 |
| 7,239,244 B2 * | 7/2007 | Leyden et al. | 340/572.9 |
| 7,571,628 B2 * | 8/2009 | D'Anieri | 70/234 |
| 7,823,424 B2 * | 11/2010 | Shabtay et al. | 70/38 A |
| 7,926,314 B2 * | 4/2011 | Tollefson | 70/49 |
| 2006/0162407 A1 * | 7/2006 | Kuhblank | 70/233 |
| 2009/0201127 A1 * | 8/2009 | Stobbe et al. | 340/5.6 |

* cited by examiner

*Primary Examiner* — Lloyd Gall

(57) ABSTRACT

A bicycle lock device for public use is disclosed. The device is comprised of an enclosure, a retractable reel with a retractable cable, a lock/unlock device having a first member attached to the cable free end, and a second member secured in the enclosure, and a lock control device. The user accesses the device by inserting a payment such as a coin or credit card in a user interface of the device. If the payment is accepted, the user then enters a user-specified key code in a keypad on the lock control device. The lock control device unlocks the lock/unlock device. The retractable cable may then be extended. The user weaves the cable through the bicycle components and then enters the cable free end into the lock/unlock device, thereby locking the lock/unlock device and securing the bicycle. When the user later enters the key-code, the device unlocks the cable.

19 Claims, 5 Drawing Sheets

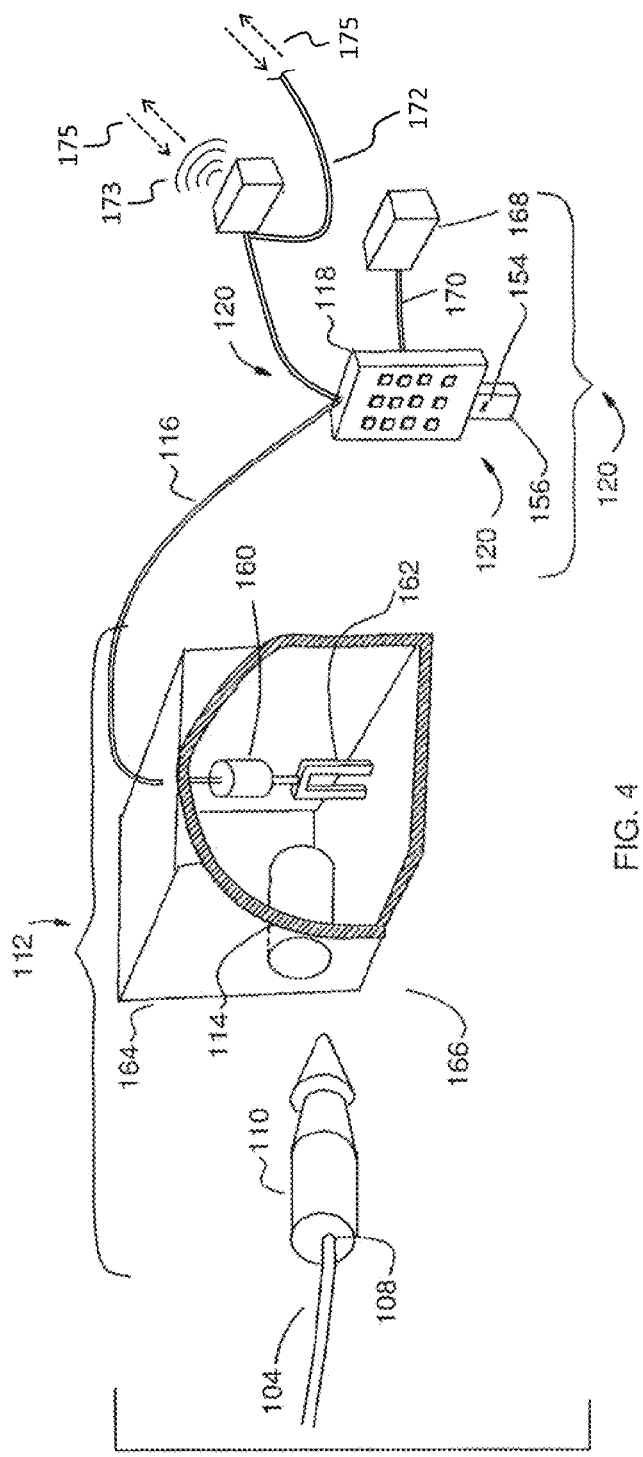
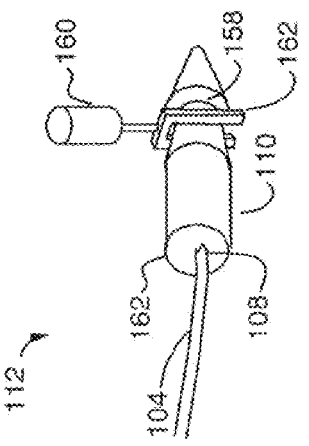
FIG. 4
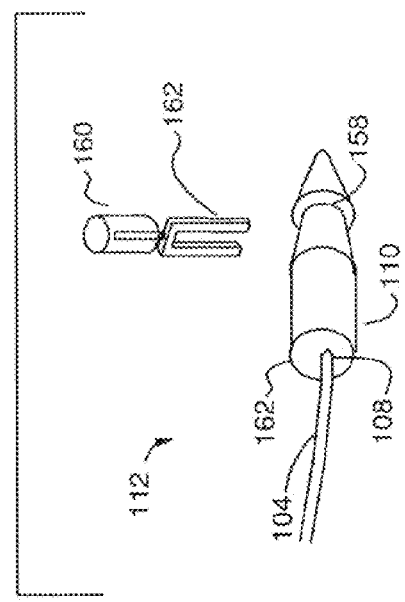
FIG. 5A
FIG. 5B

PUBLIC FACILITY BICYCLE LOCK

TECHNICAL FIELD

The invention presented herein relates to bicycle locks. More particularly, the invention relates to bicycle locks that may be shared at a public facility.

BACKGROUND OF THE DISCLOSURE

Bicycle locks, comprised of a securing component such as a cable, chain or U shaped bracket, and a locking component such as a lock and key or combination lock are in common usage. A bicycle lock that is easily carried with the bicycle has several disadvantages. Size and weight considerations of the bicycle lock limit the length of the securing component and the sophistication of the locking component. Storage of the bicycle lock while a user is biking also limits its usability. Therefore, there is a need for a bicycle lock that avoids these problems.

SUMMARY OF THE DISCLOSURE

The invention is directed at providing a convenient high quality device for securing bicycles at public locations without requiring the bicyclist to carry a personal lock. The goal of the invention is to make a geographic area biker-friendly by removing a barrier to the risk of a stolen bicycle.

The invention consists of four operationally coupled assemblies: an enclosure assembly, a retractable reel assembly, a lock/unlock assembly, and a lock control assembly. The enclosure assembly is a sealed metal or high strength composite enclosure. It houses the retractable reel assembly, one member of the lock/unlock assembly, and the lock control assembly, and provides external interfaces to these components. The retractable reel assembly is located largely within the enclosure, but has a free end that can be pulled out in length up to the limit of the reel and enclosure which can be as long as ten feet or more and wound through the bicycle as well as one's personal items. The cable's free end has attached a notched cylinder that is part of the lock/unlock assembly. The lock/unlock assembly has two cooperating members, the notched cylinder, and a composite member comprising an externally accessible receptacle cylinder, a U-shaped piece, an actuator and a case. The composite member locks or releases the notched cylinder from the U-shaped piece. The lock control assembly controls the locking and unlocking of the lock/unlock assembly. It consists of a user interface keyboard, an optional payment acceptance component that has a coin slot or credit card, slot and a linkage serving to connect the lock control assembly to the lock/unlock assembly composite member.

A user activates the system by inserting a payment in the payment slot if payment is needed. Thereafter, the user enters a one-time use 4-digit code of the user's choice. This releases the cable. The user then wraps the cable around the bicycle components and locks the bicycle by inserting the notched cylinder into the composite member. At a later time, the user enters the code, unlocking the cable. When the code is used to reopen the lock, the system automatically resets, ready for its next use. Additional system features include the ability to accept a user's preprogrammed code.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 4 is a perspective view of the lock/unlock assembly and lock control assembly of the preferred embodiment of the present invention.

FIG. 5A is a perspective view of the lock/unlock assembly when unlocked.

FIG. 5B is a perspective view of the lock/unlock assembly when locked.

DETAILED DESCRIPTION

Figure 1:
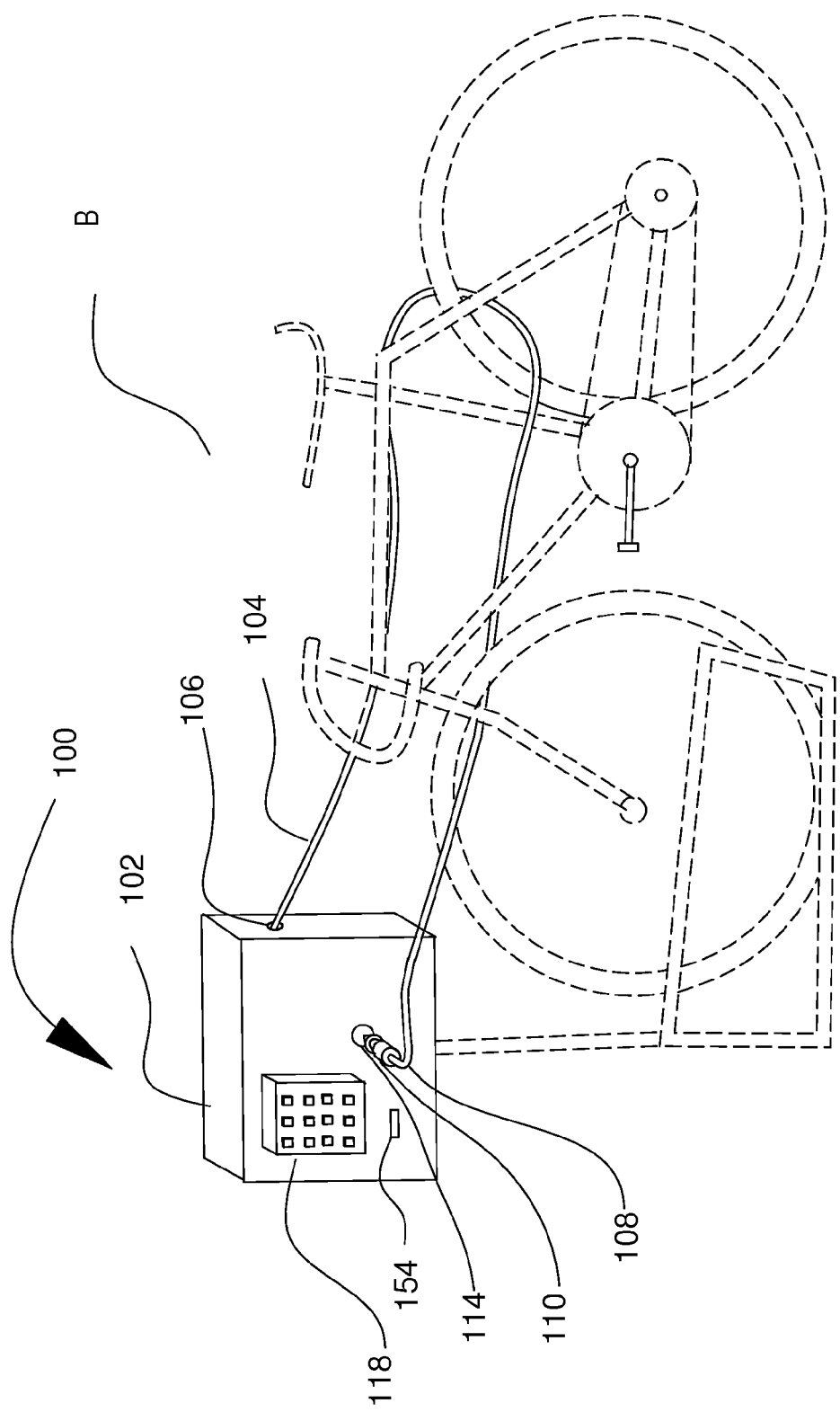
FIG. 1 is a perspective view of a preferred embodiment of the present invention.

FIG. 1 illustrates a preferred embodiment 100 of the current invention in use for securing a bicycle B. An enclosure assembly 102 has a cable 104 of any desired length such as, for example, 6 feet, 8 feet or more, etc. in length emanating from an enclosure hole 106 located on enclosure assembly 102. Cable 104 unreels going through enclosure hole 106, and when extended a user may weave cable 104 through the major parts of bicycle B. A cable free end 108 of cable 104 has attached a notched cylinder 110. To secure bicycle B, notched cylinder 110 is inserted into a cylindrical receptacle 114 located on enclosure assembly 102. Cylindrical receptacle 114 is part of a lock/unlock assembly 112. (The remaining components of lock/unlock assembly 112 are not visible in FIG. 1). Keypad 118 is a user interface for a lock control assembly 120. A user inserts a coin in a coin slot 154 when a coin is needed to operate the system. When the coin is accepted, lock control assembly 120 unlocks lock/unlock assembly 112 and allows the user to enter a key code in keypad 118. The user then secures bicycle B by weaving cable 104 through the parts of the bicycle such as the wheels and frame, and then inserting notched cylinder 110 into cylindrical receptacle 114 that secures bicycle B. Keypad 118 is then used at a later time to unlock lock/unlock assembly 112.

Figure 6:
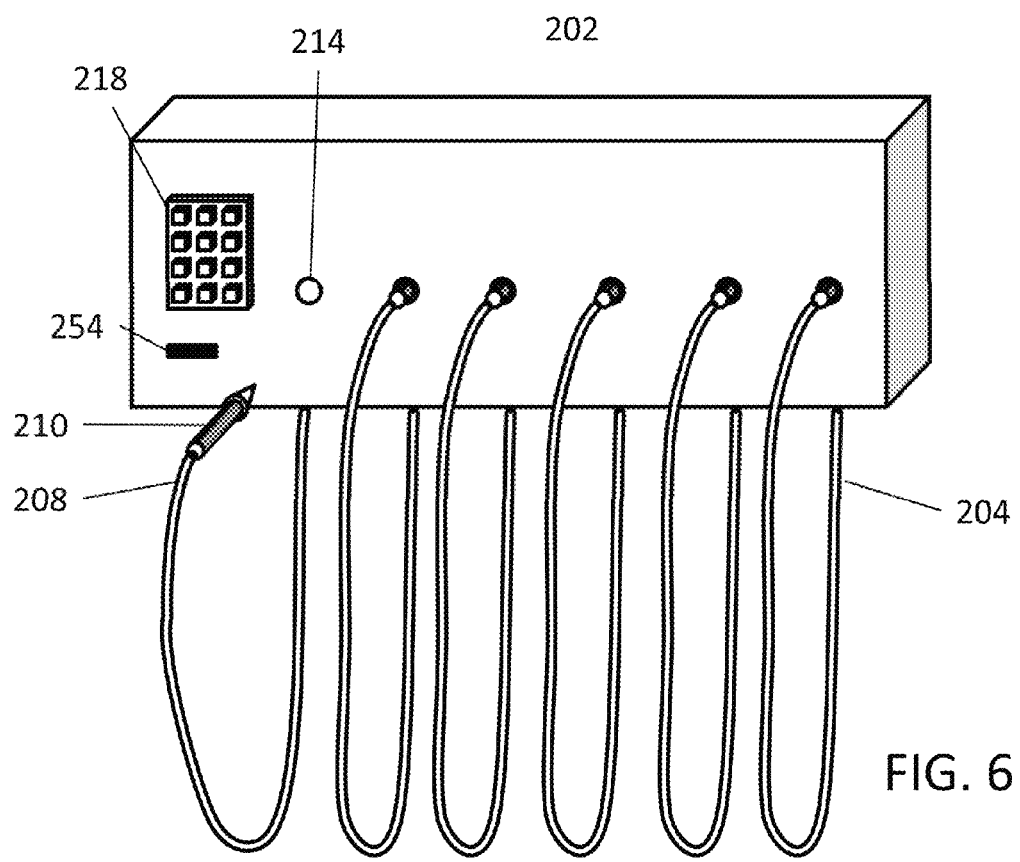
FIG. 6 shows an exemplary alternative enclosure assembly.

In another embodiment an enclosure assembly, similar to enclosure assembly 102, is not limited to a single bicycle but can have provisions for locking two or three or more bicycles. For example FIG. 6 illustrates an embodiment of an enclosure assembly 202 having cables 204 configured to exit the enclosure assembly 202 where a user may weave the cables through an item to be secured (not pictured). A cable free end 208 of cable 204 has attached a notched cylinder 210. To secure an item (not pictured), notched cylinder 210 is inserted into a cylindrical receptacle 214 located on enclosure assembly 202. The locking and unlocking mechanisms and interfaces may be similar to those described above and below. This may include the operation and interaction of a keypad 218 and optional payment acceptance component 254.

Figure 2:
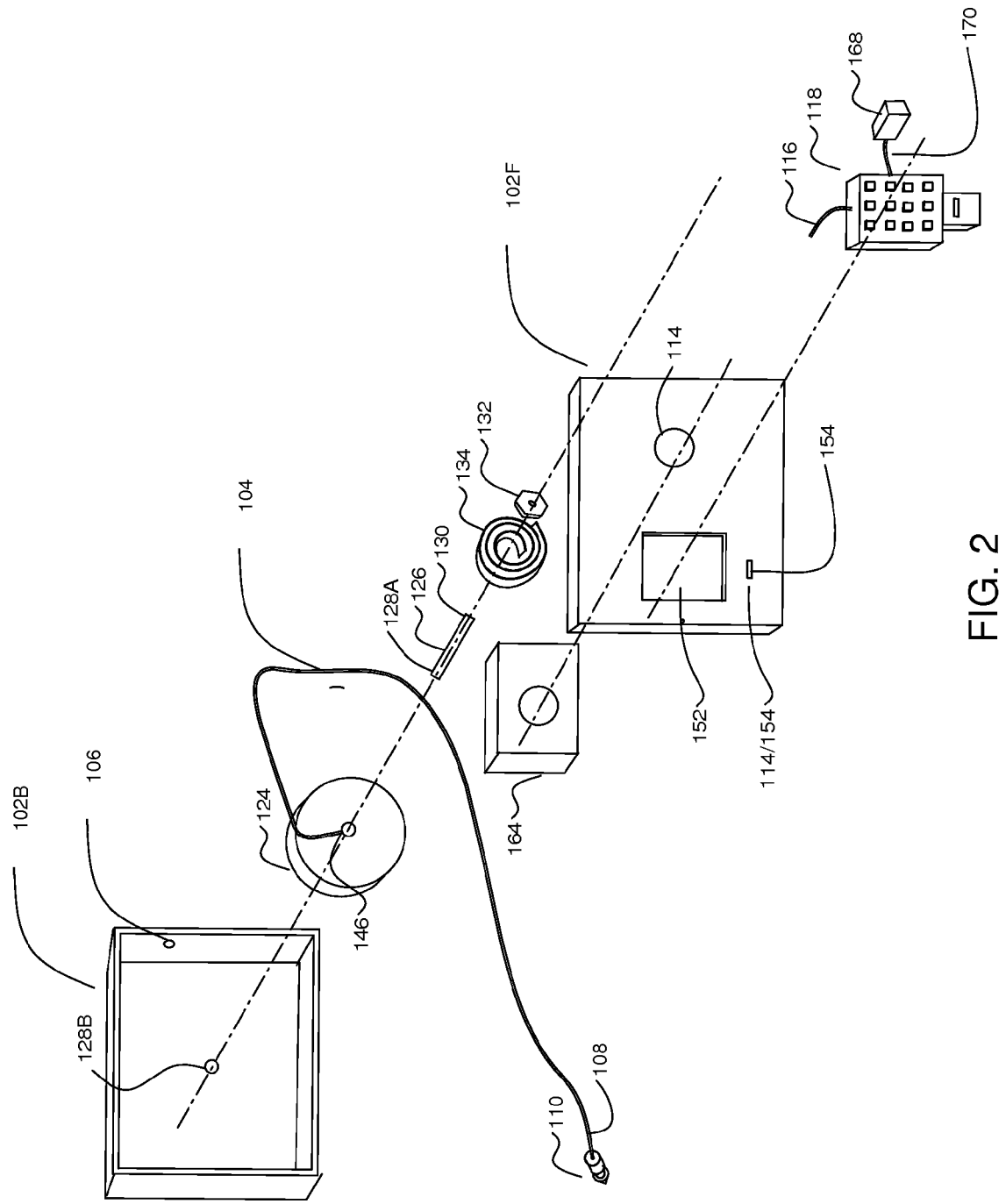
FIG. 2 is a blowup view of the preferred embodiment of the present invention.
Figure 3:
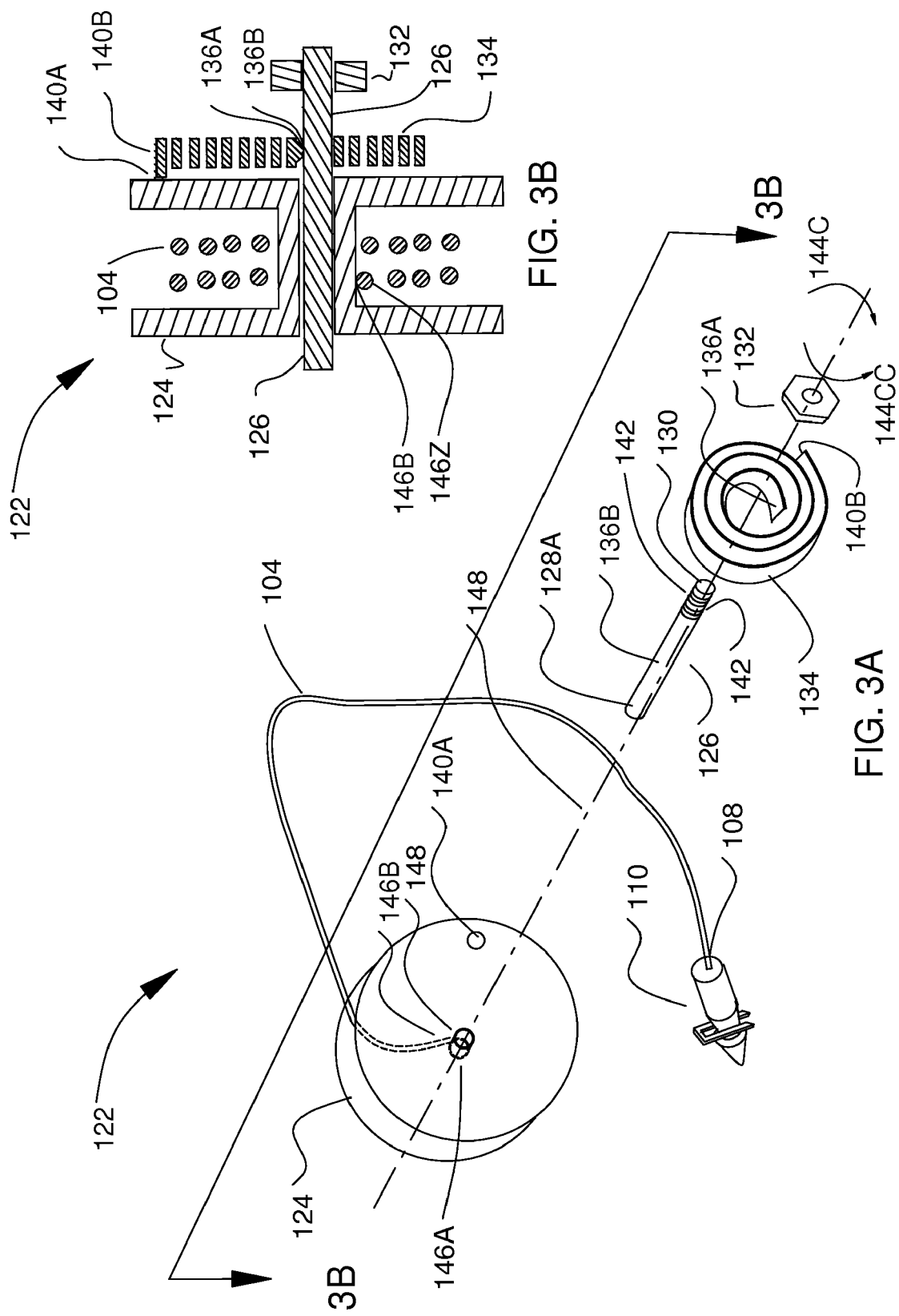
FIG. 3A is a blowup view of the reel assembly component of the preferred embodiment of the present invention.
FIG. 3B is a sectional view of FIG. 3A.

FIG. 2 illustrates a blowup of the components of preferred embodiment 100 of the present invention. FIG. 3A illustrates details of the retractable reel assembly and FIG. 3B illustrates a sectional view of FIG. 3A. Referring to FIGS. 2, 3A and 3B, enclosure assembly 102 is a sealed metal or high strength composite enclosure having an enclosure back member 102B and an enclosure front member 102F. Enclosure back member 102B and enclosure front member 102F may be opened for servicing, but otherwise is locked to protect it from malicious actions. The mechanism of locking enclosure back member 102B and enclosure front member 102F is not illustrated in FIG. 2. A retractable reel assembly 122 is comprised of a spool 124, a cable 104, a spiral spring 134, a shaft 126 and a threaded nut 132. Spool 124 is mounted on shaft 126. A shaft first end 128A is secured to the inside of enclosure back member 102B at position 128B (shown in FIG. 2). Shaft 126 has threads 142 threaded on a shaft second end 130 to accept threaded nut 132 to secure spool 124 on shaft 126.

Again referring to FIGS. 2, 3A and 3B, cable 104 is attached at cable fixed end 146A to a spool center hub 148 at spool central hub attachment point 146B on spool central hub 148. Cable 104 winds around spool central hub 148 when spiral spring 134 winds cable 104. Cable free end 108 protrudes through enclosure back end 102B through enclosure hole 106.

Again referring to FIGS. 2, 3A and 3B, spool 124 and shaft 126 are operationally coupled with a spiral spring 134. Spiral spring 134 is attached to spool 124 on spring outside end 140B at hub-spring attachment point 140A. Spring inside end 136A is attached to shaft 126 at shaft position 136B. Spiral spring 134 tightens when spool 124 is unwound in a counter-clockwise first rotational direction 144CC. When the spool 124 and cable 104 are released, spiral spring 134 rotates spool 124 in a clockwise second rotational direction 144C to rewind cable 104 on spool 124.

FIG. 4 Illustrates lock/unlock assembly 112 and lock control assembly 120 of first embodiment 100. FIG. 5A illustrates lock/unlock assembly 112 in an unlocked position. FIG. 5B illustrates lock/unlock assembly 112 in a locked position. Referring to FIG. 4, lock/unlock assembly 112 is comprised of two cooperating members: first member comprising notched cylinder 110, a second member comprising a lock/unlock composite member 166 comprising a U-shaped piece 162, an actuator 160, cylindrical receptacle 114, and case 164. Lock control assembly 120 is comprised of a user-interface keyboard 118, coin receptacle 156 having coin slot 154, first wire 116, a power source 168 and a second wire 170 connecting power source 168 to keypad 118. Power source 168 contains a battery (not illustrated in FIG. 4). First wire 116 connects keyboard 118 to actuator 160 of lock/unlock assembly 112.

Referring to FIGS. 2 and 4, notched cylinder 110 is permanently attached to cable free end 108. Notched cylinder 110 has two functions: it prevents cable 104 from being drawn back through the enclosure hole 106 (illustrated in FIG. 2) in enclosure back member 102B, and allows cable 104 to be secured to U-shaped piece 162 of lock/unlock composite member 166. Lock/unlock assembly 112 (except for notched cylinder 110) is secured inside enclosure front member 102F. Cylindrical receptacle 114, positioned in enclosure front part 102F, accepts notched cylinder 110 that is attached to cable free end 108 when notched cylinder 110 is inserted into cylindrical receptacle 114 and actuator 160 is not locked so it is free to accept notched cylinder 110. Actuator 160 is spring loaded so it will accept and lock notched cylinder 110, when it is unlocked.

Referring to FIG. 4, lock control assembly 120 controls the locking and unlocking of lock/unlock assembly 112. A user activates the system by inserting a coin in available coin slot 154. If the coin receptacle 156 accepts the coin, the user enters a one-time use 4-digit code of the user's choice into keypad 118. This causes keypad 118 to send a signal via first wire 116 to actuator 160 to release notched cylinder 110, thereby freeing cable 104. FIG. 5A illustrates the position of actuator 160 when the notched cylinder 110 is released, i.e. lock/unlock assembly 112 is in an unlocked mode. Cable 104 may then be extended outside enclosure 102. The user wraps cable 104 around the bicycle parts and inserts notched cylinder 110 into cylindrical receptacle 114. FIG. 5B illustrates the position of actuator 160 when the notched cylinder 110 is locked, i.e. lock/unlock assembly 112 is in a locked mode. At a later time, the user enters the previously set code, unlocking lock/unlock assembly 112. Lock/unlock assembly 112 then automatically resets, ready for its next use. Additionally, the lock control assembly 120 may be adjusted to not require a payment or it may be adjusted to require a payment of a set amount.

Referring to FIG. 4 the dimensions and construction of first embodiment 100 is a manufacturing option. As an example, notched cylinder 110 in first embodiment 100 is preferably made of steel with a 0.5 inches diameter, and is 2 inches long, attached to cable 104, with a ⅛" wide by ⅛" notch 158 cut around the circumference of notched cylinder 110 at a distance ½" from the end opposite the end of the notched cylinder 110 that is coupled to the cable 104, the notch 158 will be used to secure notched cylinder 110 to U-shaped piece 162. The lock/unlock assembly 112 is contained securely inside the enclosure assembly 102 using a lock/unlock assembly case 164 to prevent any manipulation other than intended lock or unlock function by the user.

Alternate implementations of the inventive concept presented herein are considered within the scope of the present invention. In an alternate embodiment, the keypad and actuator mechanism may be replaced by a key and tumbler locking system. When the coin is accepted, a key is released, allowing a user to unlock and lock the system. The system will accept a payment to release the key and will return a portion of the payment when the key is returned.

In another alternate embodiment the lock receiver that secures the cable bolt end to the lock housing can be actuated by a key, a coin, an electronic signal, etc. Accordingly, the lock/unlock assembly 112 may communicate or interface with an external system, a machine or a person through the use of a coin, key, or electronic signal. Additionally, the lock/unlock assembly 112 may communicate with at least one communication protocol to transmit and receive data 175 to and from an outside source (not pictured). The lock/unlock assembly 112 may communicate with an outside source (not pictured) by wire 172 or wireless 173.

In another alternate embodiment the cable from the lock receiver enclosure can exit the enclosure from any accessible surface such as the front, back, top, bottom or side of the enclosure.

In another alternate embodiment the invention can have one or more security features which will alert a user that the integrity of the locked cable has been broken or an attempt has been made to break the locked cable.

In another alternate embodiment of the invention an alarm security feature can be built into the cable and/or the lock station.

In another alternate embodiment of the invention a security camera on a boom can be located to record the locked bicycle.

In another alternate embodiment, a tab may be added to the system so that when the system is locked, the tab engages the spool, thereby locking it in position. This restricts further manipulation of the cable when locked.

In another alternate embodiment, the spiral spring may be replaced by a rotatable handle attached to the spool and accessible to the user such that if rotated in a first rotatable direction, the cable is retracted, and if rotated in a second rotatable direction, the cable is extended.

In another alternate embodiment, the coin receptacle may be replaced by a more sophisticated receptacle that additionally accepts paper money or credit cards.

In another alternate embodiment, power source 168 may replace or enhance battery with an external power source.

The disclosure presented herein gives preferred embodiments of the invention. These embodiments are to be considered as only illustrative of the invention and not a limitation of the scope of the invention. Various permutations, combinations, variations and extensions of these embodiments are considered to fall within the scope of this invention. Therefore the scope of this invention should be determined with reference to the claims and not just by the embodiments presented herein.

What is claimed is:

1. A bicycle locking system comprising:
an enclosure, the enclosure having an interior and an exterior;
a lock/unlock assembly having a first lock/unlock member and a second lock/unlock member,
wherein the second lock/unlock member is attached to the interior of the enclosure,
wherein the first lock/unlock member and the second lock/unlock member having a locked mode that locks the first lock/unlock member to the second lock/unlock member, and an unlocked mode that unlocks the first lock/unlock member from the second lock/unlock member,
wherein the first member of the lock/unlock assembly includes a notch, and the second member of the lock/unlock assembly comprises an electrically controlled linear actuator and a locking mechanism that includes two protruding portions that form a U-shape, the linear actuator configured to linearly slide the protruding portions in the same direction toward the notch, the locking mechanism engaging the notch by linearly sliding the protruding portions of the locking mechanism in the same direction away from the linear actuator to engage the portions within the notch, and
a retractable reel, the retractable reel having a retractable cable with a free end,
wherein the retractable reel is rotationally attached to the interior of the enclosure, and
wherein the free end is attached to the first lock/unlock member, and
wherein the cable passes through a hole located on the enclosure such that the free end may be extended exterior to the enclosure a first distance and additionally the free end may be retracted exterior to the enclosure to a second distance, and
wherein the retractable reel has a means for retracting the cable to the second distance; and
a lock control assembly, wherein the lock control assembly enables a user to unlock and lock the lock/unlock assembly.

2. The bicycle locking system of claim 1 wherein the means for retracting the cable is a spiral spring, the spiral spring being operationally coupled to the retractable reel.

3. The bicycle locking system of claim 1 wherein the notch is configured within a notched cylinder.

4. The bicycle locking system of claim 1 wherein the lock control assembly is comprised of a keypad, a payment means, a power source means and a means for connecting the lock control assembly to the lock/unlock assembly wherein when the payment means receives a valid payment, and the user enters a valid code into the keypad, then the lock control assembly unlocks the lock/unlock assembly.

5. The bicycle locking system of claim 1 wherein the lock control assembly comprises a keypad, a payment means that can be adjusted from no payment required to payment of a set amount, a power source means, and a means for connecting the lock control assembly to the lock/unlock assembly, the payment means further comprising a payment receptacle, wherein when the payment receptacle receives a valid payment, and the user enters a valid code into the keypad, then the lock control assembly unlocks the lock/unlock assembly.

6. The bicycle locking system of claim 4 wherein the payment means comprises a currency receptacle.

7. The bicycle locking system of claim 6 wherein the payment means is additionally comprised of a credit card acceptance device.

8. The bicycle locking system of claim 1 wherein the lock/unlock assembly is actuated by a key, a coin or electronically.

9. The bicycle locking system of claim 1 wherein the enclosure includes at least four lock/unlock assemblies.

10. The bicycle locking system of claim 1 wherein the lock/unlock assembly can communicate or interface with an external system, a machine or a person.

11. The bicycle locking system of claim 1 wherein the lock/unlock assembly can communicate with at least one communication protocol to transmit and receive data to and from an outside source.

12. The bicycle locking system of claim 11 wherein the lock/unlock assembly communicates with an outside source by wire or wireless.

13. The locking system of claim 1 further comprising:
a security feature wherein the security feature provides an alert to a user that the locking system is compromised.

14. The locking system of claim 1 further comprising:
a security feature wherein the security feature provides an alert to a user that an attempt to compromise the locking system has been made.

15. The locking system of claim 1 further comprising:
a security feature wherein the security feature provides an alarm if the locking system is compromised.

16. The locking system of claim 1 further comprising:
a security feature wherein the security feature provides a security camera to monitor the locking system.

17. The locking system of claim 1 further comprising:
a security feature wherein the security feature provides a security camera for monitoring an article removably coupled to the locking system.

18. A locking system comprising:
an enclosure, the enclosure having an interior and an exterior;
a lock/unlock assembly having a first lock/unlock member and a second lock/unlock member,
wherein the second lock/unlock member is attached to the interior of the enclosure,
wherein the first lock/unlock member and the second lock/unlock member have a locked mode that locks the first lock/unlock member to the second lock/unlock member, and an unlocked mode that unlocks the first lock/unlock member from the second lock/unlock member, wherein the first lock/unlock member includes a notch, and the second lock/unlock member comprises an electrically controlled linear actuator and locking mechanism that includes two protruding portions that form a U-shape, the linear actuator configured to linearly slide the protruding portions in the same direction toward the notch, the locking mechanism engaging the notch by linearly sliding the protruding portions of the locking mechanism in the same direction away from the linear actuator to engage the portions within the notch;

a retractable reel, the retractable reel having a retractable cable with a free end, wherein the retractable reel is rotationally attached to the interior of the enclosure, wherein the free end is attached to the first lock/unlock member, wherein the cable passes through a first passage located on a first surface of the enclosure such that the free end may be extended exterior to the enclosure a first distance and additionally the free end may be retracted exterior to the enclosure to a second distance, wherein the first lock/unlock member engages the second lock/unlock member through a second passage located on a second surface of the enclosure, wherein the first surface of the enclosure is different from the second surface of the enclosure; and a lock control assembly, wherein the lock control assembly enables a user to unlock the lock/unlock assembly, and such that the lock/unlock assembly enables a user to lock the lock/unlock assembly.

19. A locking system comprising:

an enclosure, the enclosure having an interior and an exterior;

a lock/unlock assembly having a first lock/unlock member and a second lock/unlock member, wherein the second lock/unlock member is attached to the interior of the enclosure, wherein the first lock/unlock member and the second lock/unlock member have a locked mode that locks the first lock/unlock member to the second lock/unlock member, and an unlocked mode that unlocks the first lock/unlock member from the second lock/unlock member, wherein the first member of the lock/unlock assembly includes a notch, and the second member of the lock/unlock assembly comprises an electrically controlled linear actuator and a locking mechanism that includes two protruding portions, the linear actuator configured to linearly slide the protruding portions in the same direction toward the notch, the locking mechanism engaging the notch by linearly sliding the protruding portions of the locking mechanism in the same direction away from the linear actuator to engage the portions within the notch, and a retractable reel, the retractable reel having a retractable cable with a free end, wherein the retractable reel is rotationally attached to the interior of the enclosure, wherein the free end is attached to the first lock/unlock member, wherein the cable passing through a first passage located on a first surface of the enclosure such that the free end may be extended exterior to the enclosure a first distance and additionally the free end may be retracted exterior to the enclosure to a second distance, wherein the first lock/unlock member engages the second lock/unlock member through a second passage located on a second surface of the enclosure, wherein the first surface of the enclosure is different from the second surface of the enclosure; and a lock control assembly, wherein the lock control assembly enables a user to unlock the lock/unlock assembly, and such that the lock/unlock assembly enables a user to lock the lock/unlock assembly.

* * * * *